(12) United States Patent
Son et al.

(10) Patent No.: US 12,130,088 B2
(45) Date of Patent: Oct. 29, 2024

(54) HEAT EXCHANGER

(71) Applicant: Hanon Systems, Daejeon (KR)

(72) Inventors: Jung Wook Son, Daejeon (KR); Hyeon Geun Chae, Daejeon (KR)

(73) Assignee: Hanon Systems, Daejeon (KR)

( * ) Notice: Subject to any disclaimer, the term of this patent is extended or adjusted under 35 U.S.C. 154(b) by 291 days.

(21) Appl. No.: 17/298,254

(22) PCT Filed: Dec. 3, 2019

(86) PCT No.: PCT/KR2019/016946
§ 371 (c)(1),
(2) Date: May 28, 2021

(87) PCT Pub. No.: WO2020/116903
PCT Pub. Date: Nov. 6, 2020

(65) Prior Publication Data
US 2022/0120507 A1    Apr. 21, 2022

(30) Foreign Application Priority Data

Dec. 6, 2018 (KR) .................. 10-2018-0155641

(51) Int. Cl.
*F28D 9/00* (2006.01)
*F28F 9/02* (2006.01)
(52) U.S. Cl.
CPC .............. *F28D 9/0031* (2013.01); *F28F 9/02* (2013.01)
(58) Field of Classification Search
CPC ........ F28D 9/00; F28D 9/0031; F28D 9/0068; F28D 2021/0082; F28D 9/0043;

(Continued)

(56) References Cited

U.S. PATENT DOCUMENTS

| 2003/0094271 A1* | 5/2003 | Leuthner | F28F 9/0268 |
| | | | 165/906 |
| 2008/0110595 A1* | 5/2008 | Palanchon | F28D 9/0043 |
| | | | 165/103 |

(Continued)

FOREIGN PATENT DOCUMENTS

| CN | 106440915 A | 2/2017 |
| CN | 108801035 A | 11/2018 |

(Continued)

OTHER PUBLICATIONS

Office Action issued on Mar. 21, 2022 by the German PTO in the corresponding Patent Application No. 11 2019 006 095.3, with English translation.

(Continued)

*Primary Examiner* — Harry E Arant
(74) *Attorney, Agent, or Firm* — Norton Rose Fulbright US LLP; James R. Crawford

(57) ABSTRACT

A heat exchanger including a plurality of fluid channel plates laminated on each other to form a cooling water fluid channel through which cooling water flows and an air fluid channel through which air flows. The fluid channel plates have a cooling water inlet hole through which the cooling water is introduced and a cooling water outlet hole through which the cooling water is discharged. Beads block the flow of the cooling water, protrude between the cooling water inlet hole and the cooling water outlet hole, are arranged to surround the periphery of the cooling water inlet hole and the cooling water outlet hole, and are spaced apart such that flow resistance of the cooling water decreases as a flow length of the cooling water increases, so that flow distribution of the cooling water can be uniform.

13 Claims, 11 Drawing Sheets

(58) Field of Classification Search
CPC ... F28D 9/004; F28F 9/02; F28F 3/025; F28F 13/08; F28F 3/042; F28F 3/046; F28F 3/048
See application file for complete search history.

(56) References Cited

U.S. PATENT DOCUMENTS

2014/0216702 A1* 8/2014 Vallee .................. F28D 1/0341
165/168
2014/0284033 A1* 9/2014 Zima .................... F28D 9/0043
165/166

FOREIGN PATENT DOCUMENTS

| DE | 102018204479 A1 | 9/2018 |
|----|-----------------|--------|
| EP | 2941784 B1 | 11/2015 |
| KR | 20060026547 A | 3/2006 |
| KR | 101116844 B1 | 3/2012 |
| KR | 20140114770 A | 9/2014 |
| KR | 20180108484 A | 10/2018 |

OTHER PUBLICATIONS

International Search Report issued in PCT/KR2019/016946 on Mar. 17, 2020.

\* cited by examiner

HEAT EXCHANGER

CROSS REFERENCE TO RELATED APPLICATIONS

This application is a national phase under 35 U.S.C. § 371 of International Application No. PCT/KR2019/016946 filed Dec. 3, 2019, which claims the benefit of priority from Korean Patent Application No. 10-2018-0155641 filed on Dec. 6, 2018. The entire contents of these applications are incorporated herein by reference in their entirety.

TECHNICAL FIELD

The present invention relates to a heat exchanger, and more particularly, to a heat exchanger capable of cooling compressed air at a high temperature and a high pressure by a supercharger to increase engine output.

BACKGROUND ART

Among heat exchangers, an intercooler is a device cooling compressed air at a high temperature and a high pressure by a supercharger to increase engine output.

The air rapidly compressed by the supercharger may have a very high temperature, which causes its volume to expand and its oxygen density to drop, resulting in a decrease in efficiency of filling the cylinder. Therefore, the intercooler may cool the compressed high-temperature air in the supercharger, thereby increasing the intake efficiency of the engine cylinder and improving the combustion efficiency to increase the fuel efficiency.

The intercooler serving this function may be divided into a water-cooled intercooler and an air-cooled intercooler based on its cooling method. Among these intercoolers, a water-cooled intercooler 10 may be similar in principle to the air-cooled intercooler, but different in that when cooling the intercooler through which the high-temperature air passes, the water-cooled intercooler 10 may cool the compressed air using cooling water of a vehicle or water instead of outside air.

The water-cooled intercooler 10 shown in FIG. 1 may include: first and second header tanks 20 and 30 spaced apart from each other by a predetermined distance and parallel to each other; a first inlet pipe 40 through which air is introduced and a first outlet pipe 50 through which the air is discharged, which are formed on the first and second header tanks 20 and 30, respectively; a plurality of tubes 60 having both ends fixed to the first and second header tanks 20 and 30, respectively, to form an air channel; fins 70 interposed between the tubes 60, respectively; a cover member 80 accommodating an assembly of the tubes 60 and the fins 70, and having one open surface and the opposite open surface on which both ends of the tubes 60 are disposed, respectively; and a second inlet pipe 41 through which the cooling water is introduced and a second outlet pipe 51 through which the cooling water is discharged, which are formed on one side of the cover member 80.

In addition, on the contrary, the water-cooled intercooler may be configured to allow the cooling water to pass through the inside of the tubes, dispose a heat exchanger core, which is an assembly of header tanks, tubes and fins, in the intercooler, and form a case to surround the core, thereby cooling the air using the core while the air passes through the inside of the case.

However, in order to improve its heat exchange efficiency, a heat exchanger such as the water-cooled intercooler may distribute the cooling water by having a deflector formed in the shape of a protrusion protruding from a flow channel plate forming a cooling water flow channel through which the cooling water flows, and guiding the flow of the cooling water, as shown in FIG. 2. However, the cooling water is supposed to flow along a short flow channel having a small flow resistance, and it is thus difficult to uniformly distribute the flow. Therefore, a separate structure is required to uniformly distribute the flow of the cooling water.

PRIOR ART DOCUMENT

Patent Document

KR 10-1116844 B1 (Feb. 8, 2012)
EP 2941784 A1 (Nov. 11, 2015)

DISCLOSURE

Technical Problem

An object of the present invention is to provide a heat exchanger having flow channels through which cooling water and air respectively flow by laminating flow channel plates on each other, wherein the flow of the cooling water may be uniformly distributed by the beads protruding from the flow channel plates to guide the flow of the cooling water, thereby improving cooling efficiency of the heat exchanger.

Technical Solution

In one general aspect, a heat exchanger includes: a plurality of flow channel plates laminated on each other to respectively form a cooling water flow channel through which cooling water may flow and an air flow channel through which air may flow, wherein a cooling water inlet hole through which the cooling water is introduced and a cooling water outlet hole through which the cooling water is discharged may be formed in the flow channel plate while being spaced apart from each other, and beads blocking the cooling water from flowing between the cooling water inlet hole and the cooling water outlet hole may protrude from the flow channel plate, and the beads may be arranged to surround each periphery of the cooling water inlet hole and the cooling water outlet hole, and spaced apart from each other for flow resistance of the cooling water to decrease as a flow length of the cooling water increases.

In addition, a gap between the beads adjacent to each other may be made wider as a distance between the cooling water inlet hole and the cooling water outlet hole increases.

In addition, the beads may be arranged along the periphery of the cooling water inlet hole or cooling water outlet hole.

In addition, the bead may include a protrusion formed in the shape of a dot or line along the periphery of the cooling water inlet hole or cooling water outlet hole.

In addition, the bead may include the protrusions formed in the shapes of the dot and line and disposed alternately with each other while being spaced apart from each other.

In addition, the bead may include a flow guide protruding in the shape of a line extending outward from the periphery of the cooling water inlet hole or cooling water outlet hole.

In addition, the flow guide may be disposed on one side of the cooling water flow channel in the width direction based on the cooling water inlet hole or the cooling water outlet hole.

In addition, as the distance between the cooling water inlet hole and the cooling water outlet hole increases, a distance between ends of the flow guide may be made longer.

In addition, the cooling water inlet hole and the cooling water outlet hole may be formed in the center of the cooling water flow channel in the width direction, and the flow guide may be formed on one or both sides of each of the cooling water inlet hole and the cooling water outlet hole, in the width direction.

In addition, the flow guide may have an outer portion bent in a direction between the cooling water inlet hole and the cooling water outlet hole.

In addition, as the flow guide is disposed at a portion having a shorter distance between the cooling water inlet hole and the cooling water outlet hole, the outer portion of the flow guide may be bent at a larger angle.

In addition, the flow guide may have a first rib which is formed in the shape of a straight line and close to the cooling water inlet hole or the cooling water outlet hole and a second rib which is formed in the shape of a straight line and far away from the hole, the first rib and the second rib being connected with each other, and the second rib being bent in a direction between the cooling water inlet hole and the cooling water outlet hole based on the first rib.

In addition, the flow guide may have the first rib formed parallel to the width direction of the cooling water flow channel.

In addition, the flow guide may have the first rib bent in the direction between the cooling water inlet hole and the cooling water outlet hole based on the width direction of the cooling water flow channel.

In addition, as the flow guide is disposed at a portion having a shorter distance between the cooling water inlet hole and the cooling water outlet hole, the second rib may be bent at a larger angle based on the width direction of the cooling water flow channel.

Advantageous Effects

As set forth above, the present invention may provide the heat exchanger in which the flow of the cooling water may be uniformly distributed by the beads protruding from the flow channel plates to guide the flow of the cooling water, thereby improving cooling efficiency of the heat exchanger.

BEST MODE

Hereinafter, a heat exchanger of the present invention having the above-described configuration is described in detail with reference to the accompanying drawings.

Figure 1:
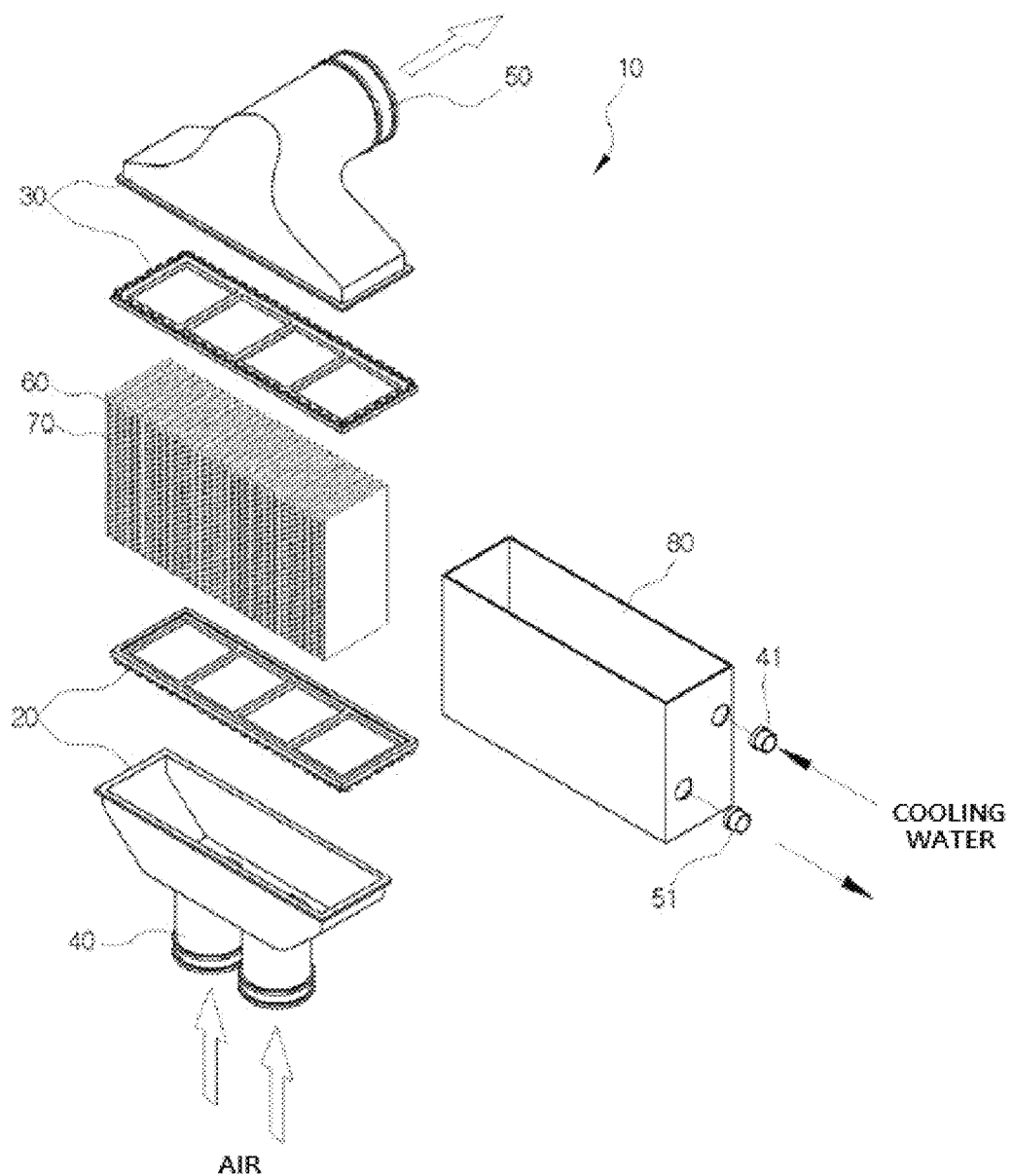
FIG. 1 is an exploded perspective view showing a conventional water-cooled intercooler.
Figure 2:
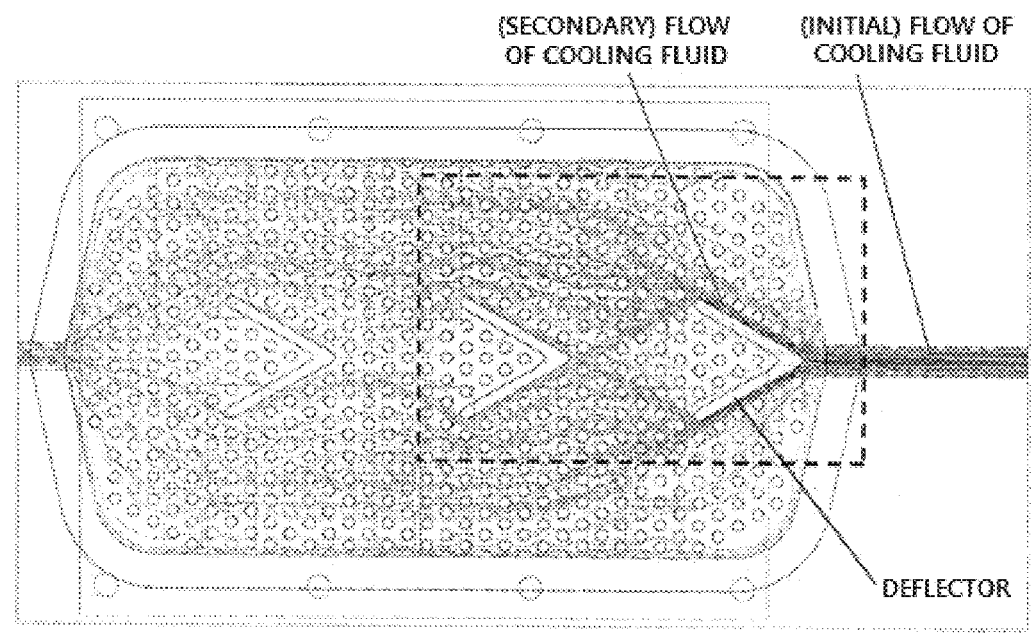
FIG. 2 is a plan view showing a heat sink (flow channel plate) in which a cooling fluid flow channel is formed in a conventional heat exchanger.
Figure 3:
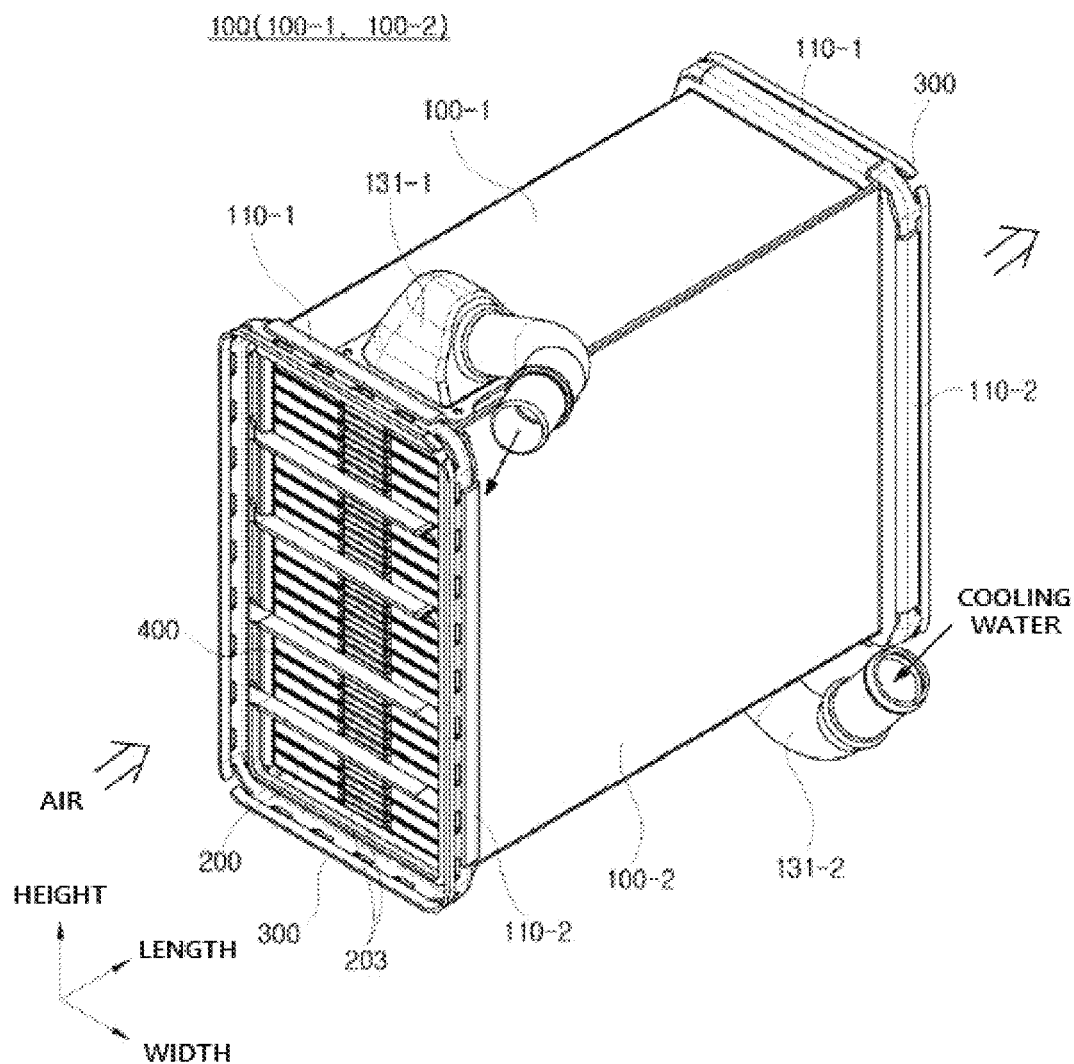
FIGS. 3 and 4 are an assembled perspective view and an exploded perspective view, each showing a heat exchanger according to an exemplary embodiment of the present invention.
Figure 4:
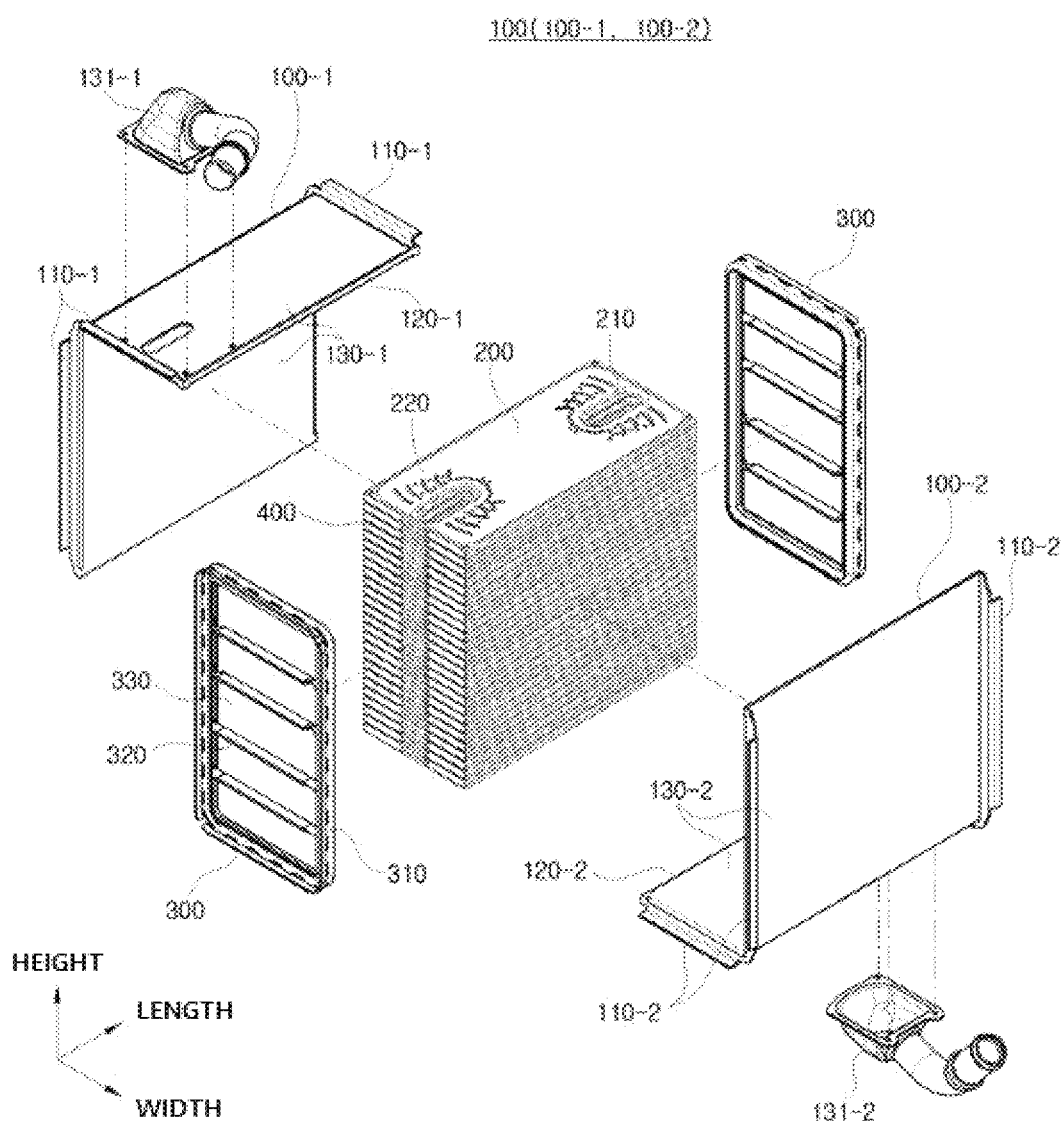
Figure 5:
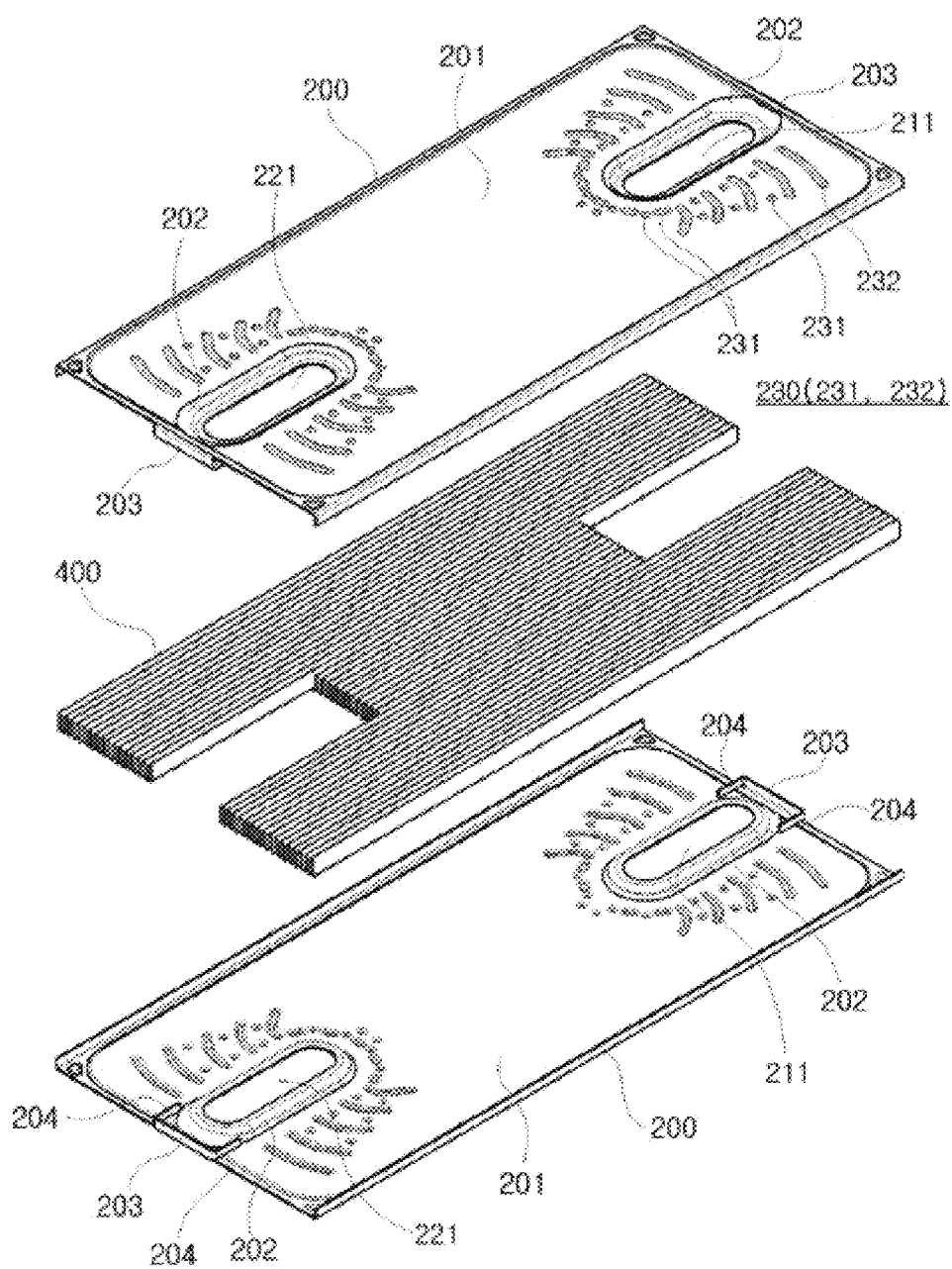
FIGS. 5 and 6 are an exploded perspective view and an assembled perspective view, each showing a laminated structure of flow channel plates and a fin in the heat exchanger according to an exemplary embodiment of the present invention.
Figure 6:
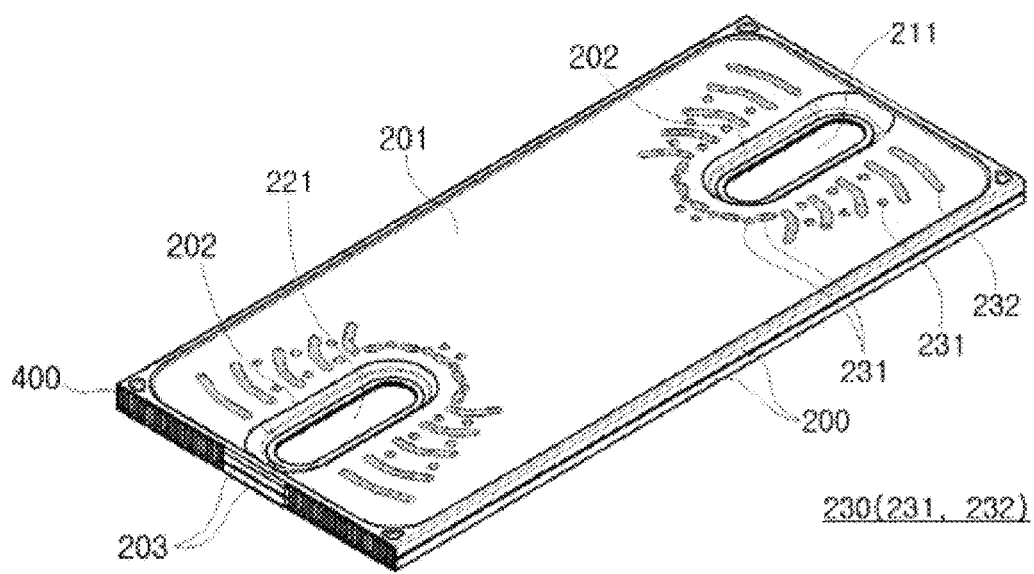
Figure 7:
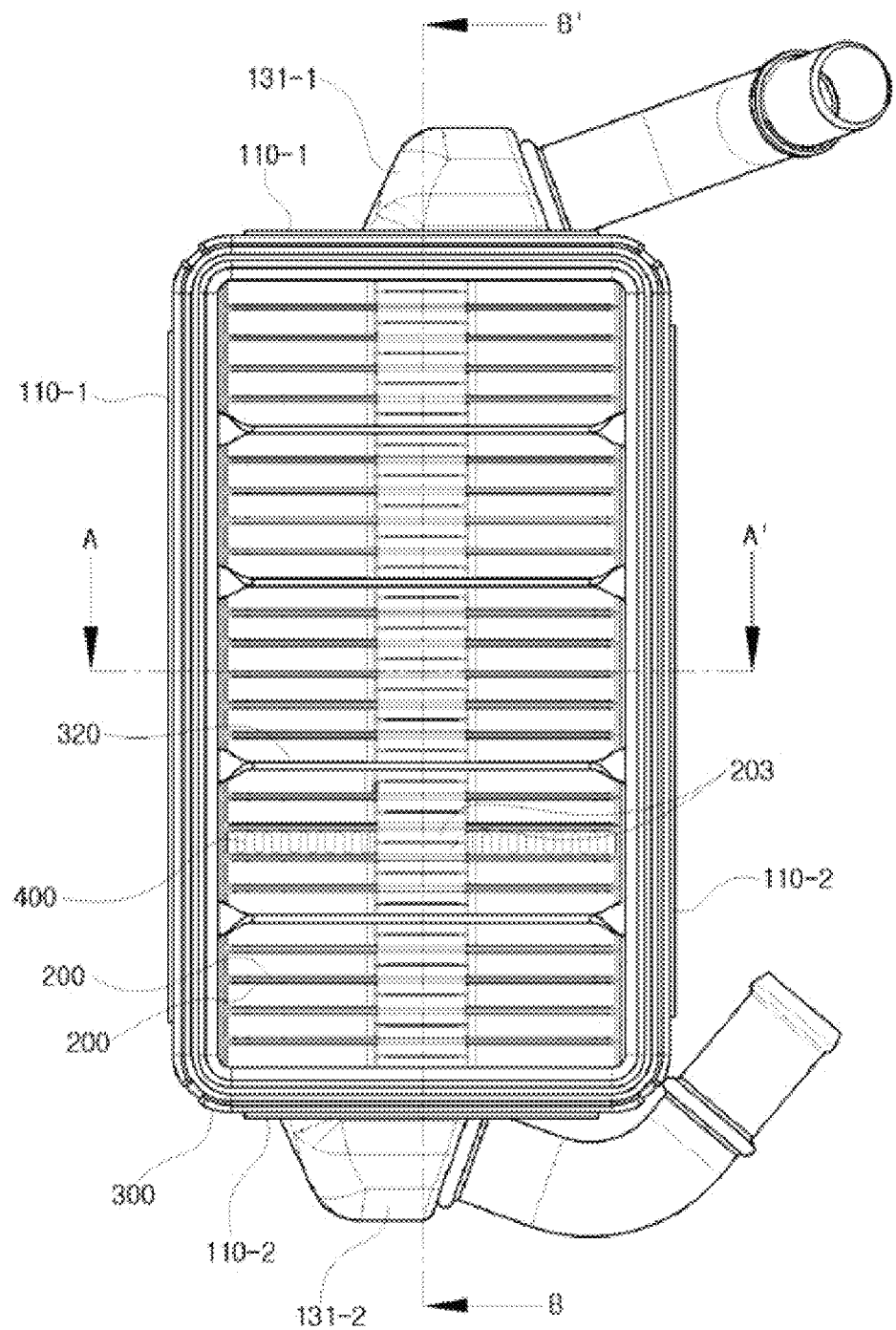
FIG. 7 is a front view showing the heat exchanger according to an exemplary embodiment of the present invention.
Figure 8:
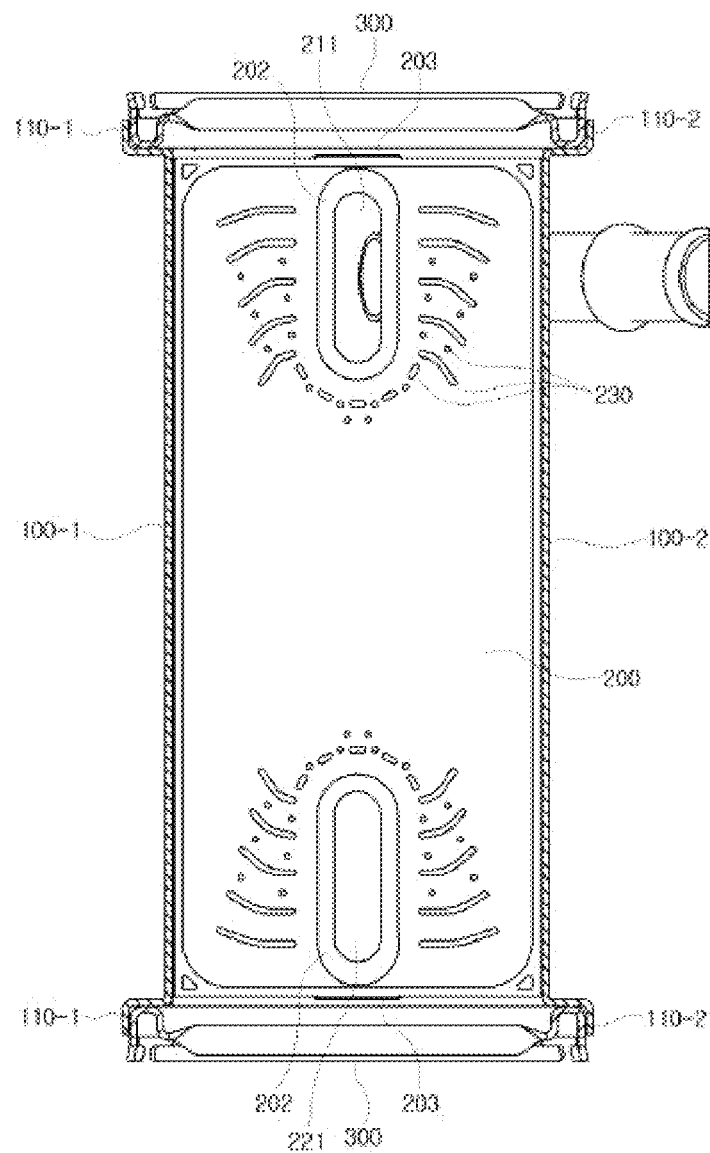
FIG. 8 is a cross-sectional view in direction A-A' of FIG. 7.
Figure 9:
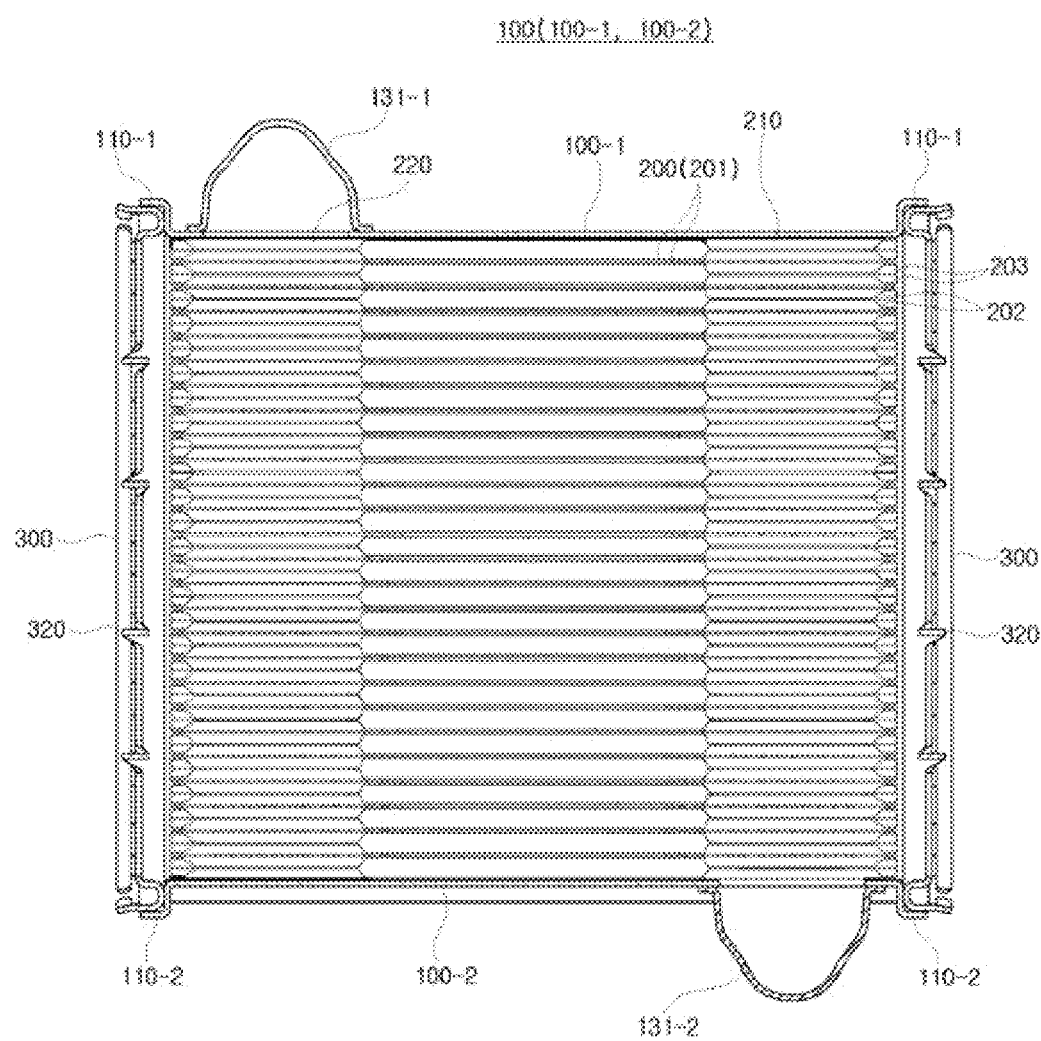
FIG. 9 is a cross-sectional view in direction B-B' of FIG. 7.
Figure 10:
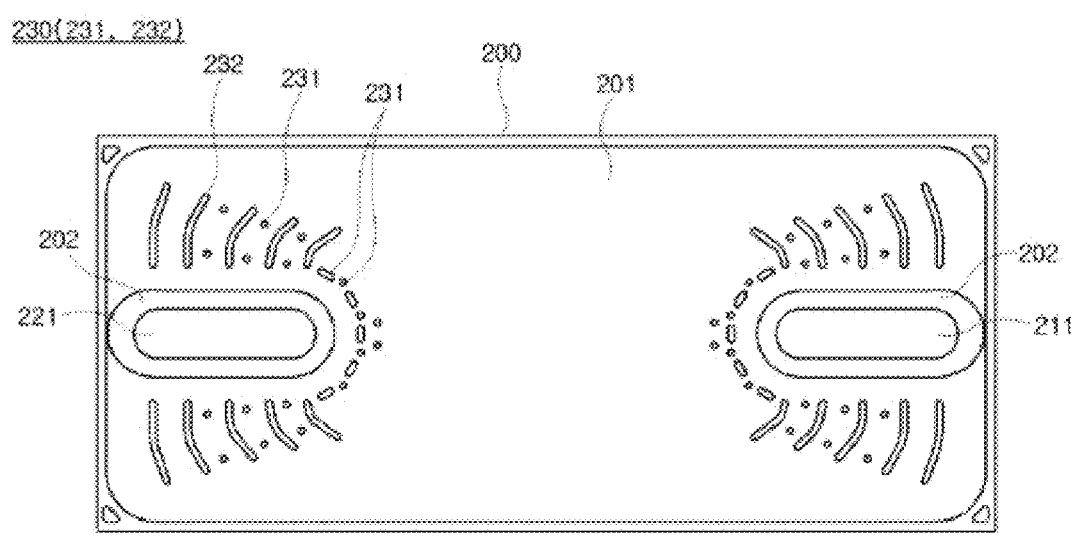
FIGS. 10 and 11 are plan views each showing a detailed structure of the flow channel plate in the heat exchanger according to an exemplary embodiment of the present invention.
Figure 11:
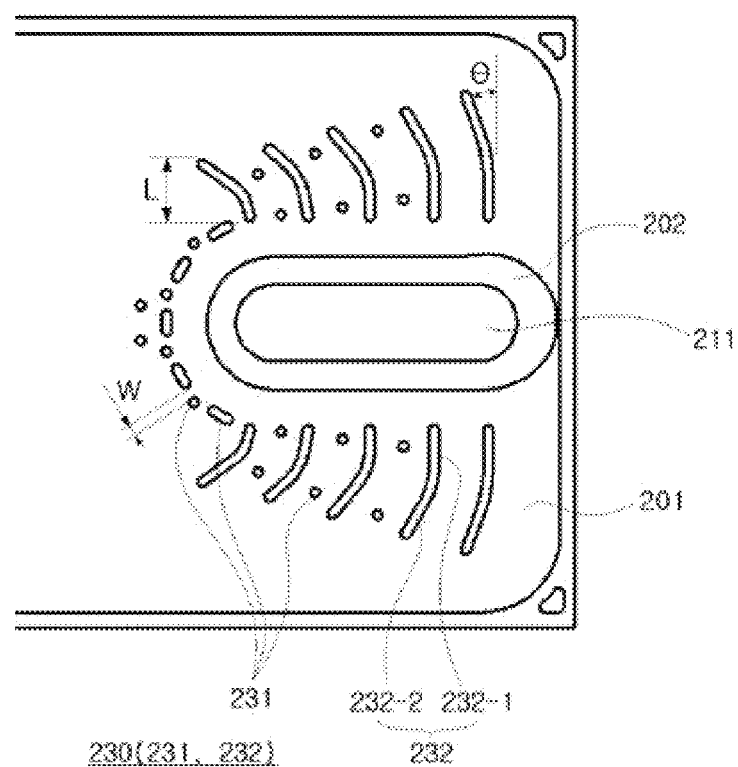

FIGS. 3 and 4 are an assembled perspective view and an exploded perspective view, each showing a heat exchanger according to an exemplary embodiment of the present invention; and FIGS. 5 and 6 are an exploded perspective view and an assembled perspective view, each showing a laminated structure of flow channel plates and a fin in the heat exchanger according to an exemplary embodiment of the present invention. In addition, FIG. 7 is a front view showing the heat exchanger according to an exemplary embodiment of the present invention; and FIGS. 8 and 9 are respective cross-sectional views in directions A-A' and B-B' of FIG. 7.

As shown in the drawings, the heat exchanger according to an exemplary embodiment of the present invention may roughly include a case 100, a plurality of flow channel plates 200 and a pair of headers 300. In addition, although not shown, a tank may be coupled to each of the pair of headers 300, and the tank may form a space in which air may flow by being coupled to the header. Here, the tank may be formed in the shape of a container having an open side facing the header, and may have an inlet through which air is introduced and an outlet through which the air is discharged.

The case 100 may include a first member 100-1 and a second member 100-2, and the first member 100-1 and the second member 100-2 may be coupled to each other to form an accommodation space therein. In addition, header fitting portions 110-1 and 110-2 may be formed on each of the opposite ends of the case 100, to which the first member 100-1 and the second member 100-2 are respectively coupled, and the header 300 may be inserted into and accommodated in the header fitting portions 110-1 and 110-2. Here, the case 100 may have body portions 130-1 and 130-2 forming the shape of a square tube together, and the header fitting portions 110-1 and 110-2 formed on each of two open ends of the body portions 130-1 and 130-2 may extend outward from each of the two ends of the body portions.

The plurality of flow channel plates 200 may be laminated on each other in the height direction and bonded to each other. The plurality of flow channel plates 200 may be laminated on each other and then bonded to each other by brazing to respectively form a cooling water flow channel through which cooling water may flow and an air flow channel through which air may flow. For example, as shown in the drawings, a cooling water inlet hole 211 and a cooling water outlet hole 221 which pass through the flow channel plates 200 vertically may be respectively formed on both sides of the flow channel plates 200 in the longitudinal direction, and the periphery of each hole may protrude toward the air flow channel to form a cup portion 202. That is, the cup portion 202 may be formed in the shape of a cup having a hole in its bottom surface, and may be formed concave on a surface adjacent to the cooling water flow channel and may protrude convexly from a surface adjacent to the air flow channel, based on a plate 201. For example, here, the cooling water inlet hole 211 and the cooling water outlet hole 221 may be formed to be spaced apart from each other in the longitudinal direction. Therefore, the plurality of flow channel plates 200 may be laminated on each other to form an inlet tank portion 210 into which the cooling water is introduced on one side thereof in the longitudinal direction and an outlet tank portion 220 from which the cooling water is discharged on the other side thereof.

In addition, beads 230 blocking the cooling water from flowing between the cooling water inlet hole 211 and the cooling water outlet hole 221 may protrude from the flow channel plate 200. Here, the beads 230 may be arranged to surround each periphery of the cooling water inlet hole 211 and the cooling water outlet hole 221. In addition, the beads 230 may be arranged along each periphery of the cooling water inlet hole 211 and the cooling water outlet hole 221. The beads 230 surrounding the cooling water inlet hole 211 may be spaced apart from each other along the periphery of the cooling water inlet hole 211, and the cooling water may thus pass through a space between the beads 230. In the same manner, the beads 230 surrounding the cooling water outlet hole 221 may also be spaced apart from each other along the periphery of the cooling water outlet hole 221, and the cooling water may thus pass through a space between the beads 230. In addition, for example, the flow channel plates 200 may be formed in such a manner that: two flow channel plates opposing each other are laminated on each other and then bonded to each other to form a single tube in which the cooling water flow channel is formed; a corrugated fin 400 is interposed between the tubes to be bonded to the tubes; and an empty space between the tubes is formed as an air flow channel through which air flows. FIGS. 5 and 6 each show a laminated assembly having the fin 400 interposed between the two flow channel plates 200, in which the air flow channel through which air flows may be formed between the two flow channel plates 200 having the fin 400 disposed therebetween. In addition, a plurality of assemblies as described above may be laminated on each other to form an assembly as shown in FIG. 4, in which the flow channel plates and the fins are laminated on each other and then assembled to each other. In addition, FIG. 3 or 4 does not show the shape of the fin, and only a portion of FIG. 7 shows the shape of the fin 400. However, the fins may be arranged in a uniform arrangement as described above and as the structure shown above. In addition, an inlet blocking portion 203 may be positioned close to the cup portion 202 to block the periphery of the cup portion 202, and air may thus be blocked from flowing toward the cup portion 202 by the inlet blocking portion 203.

The header 300 is a portion forming a space in which air may flow by being coupled with the tank as described above, and each header 300 may be inserted into the header fitting portions 110-1 and 110-2 on each of the two ends of the case 100, bonded by brazing or the like and then coupled thereto. In addition, the header 300 may be formed in the shape of a rectangular frame 310, and may have an opening 330 therein, which penetrates through both sides of the header 300 in the longitudinal direction. The opening 330 may be connected to the air flow channel formed by laminating the flow channel plates 200 on each other. In addition, the header 300 may have reinforcing ribs 320 connecting the inner sides of the frame 310 to each other and supporting the same.

Here, the cooling water introduced to a cooling water inlet portion 131-2 formed on the second member 100-2 of the case 100 may flow to the inlet tank portion 210 formed by laminating the flow channel plates 200 on each other, may pass through the cooling water flow channel formed by the flow channel plates 200, may be collected in the outlet tank portion 220 formed by laminating the flow channel plates 200 on each other, and may be discharged to a cooling water outlet portion 131-1 formed on the second member 100-2 of the case 100. In addition, air may flow from one header 300 to the other header. The air may flow through the opening 330 of the header 300 positioned on one side in the longitudinal direction, pass through the air flow channel between the flow channel plates 200, and may flow through the opening 330 of the header 300 positioned on the other side in the longitudinal direction.

Here, flow resistance existing when the cooling water flows may be proportional to a flow length of the cooling water, and the flow length of the cooling water on the flow channel plate may be a channel through which the cooling water flows from the cooling water inlet hole 211 to the cooling water outlet hole 221. In more detail, the cooling water may flow from the cooling water inlet hole 211 toward the cooling water outlet hole 221 passing through the space between the beads 230 formed along the periphery of the cooling water inlet hole 211, may pass through the space between the beads 230 formed along the periphery of the cooling water outlet hole 221, and may then flow to the cooling water outlet hole 221. That is, the beads 230 may become the flow resistance when the cooling water flows, and the space between the beads 230 adjacent to each other may become a channel through which the cooling water may pass. Here, the beads 230 may be spaced apart from each other for the flow resistance of the cooling water to decrease as the flow length of the cooling water increases.

Therefore, on a portion where the cooling water has a long flow length, a gap W between the beads 230 adjacent to each other may be made wider so that the cooling water has a small flow resistance. On the contrary, on a portion where the cooling water has a short flow length, the gap W between the beads 230 adjacent to each other may be made narrower so that the cooling water has a large flow resistance. In this manner, the cooling water of the flow channel plate 200 may be uniformly distributed and flow across an entire width of the flow channel. Accordingly, in the heat exchanger of the present invention, the flow of the cooling water may be uniformly distributed by the beads protruding from the flow channel plates to guide the flow of the cooling water, thereby improving cooling efficiency of the heat exchanger.

In addition, the gap W between the beads 230 adjacent to each other may be made wider as a distance between the cooling water inlet hole 211 and the cooling water outlet hole 221 increases. That is, as shown in the drawings, as the distance between the cooling water inlet hole 211 and the cooling water outlet hole 221 increases, the cooling water may have a longer flow length, and its flow resistance may thus increase. Therefore, as the distance between the cooling water inlet hole 211 and the cooling water outlet hole 221 increases, the gap W between the beads 230 may be made wider, and the flow of the cooling water may be uniformly distributed.

In addition, the bead 230 may include a protrusion 231 and a flow guide 232. Here, the protrusion 231 may protrude in the shape of a dot or line along the periphery of the cooling water inlet hole 211 or cooling water outlet hole 221, and the protrusions formed in the shapes of the dot and line may be disposed alternately with each other while being spaced apart from each other. In addition, the flow guide 232 may protrude in the shape of a line extending outward from the periphery of the cooling water inlet hole 211 or the cooling water outlet hole 221. For example, the protrusion 231 may have a cross section protruding in the shape of a cylinder or oval, or may be elongated in the shape of a rib. In addition, the flow guide 232 may be elongated in the shape of the rib.

In addition, as the distance between the cooling water inlet hole 211 and the cooling water outlet hole 221 increases, a distance L between ends of the flow guide 232 may be made longer. That is, if the flow guide 232 formed on the periphery of the cooling water inlet hole 211 is taken as an example, the distance L between the ends of the flow guide 232 may be defined as a length from an inner end of the flow guide 232 in the width direction, which is close to the cooling water inlet hole 211, to an outer end of the flow guide 232, which is far away from the cooling water inlet hole 211. In addition, as the distance between the cooling water inlet hole 211 and the cooling water outlet hole 221 increases, i.e. as each hole is farther outward in the longitudinal direction, the distance L between the ends of the flow guide 232 may be made longer. In this manner, the cooling water flow channels may not overlap each other across the entire cooling water flow channel formed on the flow channel plate 200 in the width direction, and the flow of the cooling water may be uniformly distributed.

In addition, the cooling water inlet hole 211 and the cooling water outlet hole 221 may be formed in the center of the flow channel plate 200 in the width direction, and the flow guide 232 may be disposed on one or both sides of each of the cooling water inlet hole 211 and the cooling water outlet hole 221, in the width direction. That is, the cooling water is supposed to flow toward the center in the width direction, in which the center has the shortest distance between the cooling water inlet hole 211 and the cooling water outlet hole 221 and has a smaller flow resistance. Therefore, the flow guides 232 may be formed on both sides of each of the cooling water inlet hole 211 and the cooling water outlet hole 221 in the width direction to uniformly distribute the flow of the cooling water, thereby guiding the flow of the cooling water.

In addition, the flow guide 232 may have an outer portion bent in a direction between the cooling water inlet hole 211 and the cooling water outlet hole 221. If the flow guide 232 formed on the periphery of the cooling water inlet hole 211 is to be explained, the flow guide 232 may have a first rib 232-1 which is a portion close to the cooling water inlet hole 211 and a second rib 232-2 which is a portion far away from the hole, the first rib 232-1 and the second rib 232-2 being connected to each other, and the second rib 232-2 being bent from the first rib 232-1. Here, the second rib 232-2 may be bent obliquely toward the cooling water outlet hole 221 in the width direction. The channel through which the cooling water flows may thus be gradually changed. On the contrary, the flow guides 232 formed on the periphery of the cooling water outlet hole 221 may have the second rib 232-2 bent obliquely toward the cooling water inlet hole 221 in the width direction.

In addition, as the flow guide 232 is disposed at a portion having a shorter distance L between the cooling water inlet hole 211 and the cooling water outlet hole 221, the outer portion of the flow guide 232 may be bent at a larger angle θ. That is, as shown in the drawings, as the flow guide 232 is disposed at a portion having a shorter distance between the cooling water inlet hole 211 and the cooling water outlet hole 221, the second rib 232-2 may be bent at a larger angle based on the width direction of the cooling water flow channel. In addition, among the flow guides 232, the flow guide 232 disposed at a portion having a longer distance between the cooling water inlet hole 211 and the cooling water outlet hole 221 may have the first rib 232-1 formed parallel to the width direction of the cooling water flow channel, and the flow guide 232 disposed at a portion having a shorter distance between the cooling water inlet hole 211 and the cooling water outlet hole 221 may have the first rib 232-1 bent in a direction between the cooling water inlet hole 221 and the cooling water outlet hole 221 while going outward in the width direction based on the width direction of the cooling water flow channel. The first rib 232-1 of the flow guide 232 may also be bent in the direction between the cooling water inlet hole 211 and the cooling water outlet hole 221 based on the width direction, and as the flow guide 232 is disposed at a portion having a shorter distance between the cooling water inlet hole 211 and the cooling water outlet hole 221, the second rib 232-1 may be bent at a larger angle.

In addition, although not shown, the cooling water flow channel, through which the cooling water between the cooling water inlet hole 211 and the cooling water outlet hole 221 flows, may have protruding portions formed to increase a heat exchange area, and partitions formed to control a flow direction of the cooling water, in addition to the beads 230.

The present invention is not limited to the abovementioned exemplary embodiments, but may be variously applied. In addition, the present invention may be variously modified by those skilled in the art to which the present invention pertains without departing from the gist of the present invention claimed in the claims.

DESCRIPTION OF REFERENCE NUMERALS

100: case
100-1: first member
110-1: header fitting portion, 111-1: first bent portion
112-1: second bent portion, 111-1a: connecting portion
120-1: case coupling portion, 130-1: body
130-1a: first surface portion, 130-1b: second surface portion
131-1: cooling water outlet portion
100-2: second member
110-2: header fitting portion, 111-2: first bent portion
112-2: second bent portion, 111-2a: connecting portion
120-2: case coupling portion, 130-2: body
130-2a: first surface portion, 130-2b: second surface portion
131-2: cooling water inlet portion
200: flow channel plate
201: plate, 202: cup portion
203: inlet blocking portion, 204: side support portion
210: inlet tank portion, 220: outlet tank portion
211: cooling water inlet hole, 221: cooling water outlet hole
230: bead, 231: protrusion
232: flow guide, 232-1: first rib
232-2: second rib,
300: header, 310: frame portion
320: reinforcing rib, 330: opening
400: fin

The invention claimed is:

1. A heat exchanger comprising a plurality of flow channel plates laminated on each other to respectively form a cooling water flow channel through which cooling water flows and an air flow channel through which air flows, wherein a cooling water inlet hole through which the cooling water is introduced and a cooling water outlet hole through which the cooling water is discharged are formed in the flow channel plate while being spaced apart from each other, and beads blocking the cooling water from flowing between the cooling water inlet hole and the cooling water outlet hole protrude from the flow channel plate, and the beads are arranged to surround each periphery of the cooling water inlet hole and the cooling water outlet hole, and spaced apart from each other for flow resistance of the cooling water to decrease as a flow length of the cooling water increases, wherein the beads are arranged along the periphery of the cooling water inlet hole or cooling water outlet hole, wherein the gap between adjacent beads becomes wider as the coolant inlet hole and the coolant discharge hole go outward in the direction away from each other, wherein the gap between neighboring beads is the shortest distance between beads at a location adjacent to the cooling water inlet hole or the cooling water outlet hole, wherein the gap between neighboring beads is the distance in the direction in which the beads are adjacent to each other along the circumference of the cooling water inlet hole or the cooling water outlet hole.

2. The heat exchanger of claim 1, wherein at least one bead of the beads includes a protrusion formed in the shape of a dot or line along the periphery of the cooling water inlet hole or cooling water outlet hole.

3. The heat exchanger of claim 2, wherein at least one bead of the beads includes the protrusions formed in the shapes of the dot and line and disposed alternately with each other while being spaced apart from each other.

4. The heat exchanger of claim 1, wherein the beads include a flow guide protruding in the shape of a line extending outward from the periphery of the cooling water inlet hole or cooling water outlet hole.

5. The heat exchanger of claim 4, wherein the flow guide is disposed on one side of the cooling water flow channel in the width direction based on the cooling water inlet hole or the cooling water outlet hole.

6. The heat exchanger of claim 4, wherein as the distance between the cooling water inlet hole and the cooling water outlet hole increases, a distance between ends of the flow guide is made longer.

7. The heat exchanger of claim 4, wherein the cooling water inlet hole and the cooling water outlet hole are formed in a center of the cooling water flow channel in the width direction, and the flow guide is formed on one or both sides of each of the cooling water inlet hole and the cooling water outlet hole, in the width direction.

8. The heat exchanger of claim 4, wherein the flow guide has an outer portion bent in a direction between the cooling water inlet hole and the cooling water outlet hole.

9. The heat exchanger of claim 8, wherein as the distance between the coolant inlet hole and the coolant outlet hole of the flow guides decreases, the angle at which the outer portion of the flow guide is bent gradually increases.

10. The heat exchanger of claim 4, wherein the flow guide has a first rib which is formed in the shape of a straight line and a second rib which is formed in the shape of a straight line, wherein the first rib and the second rib are connected with each other, and the second rib is bent in a direction between the cooling water inlet hole and the cooling water outlet hole based on the first rib; wherein the first rib is positioned closer to the cooling water inlet hole than the second rib.

11. The heat exchanger of claim 10, wherein the flow guide has the first rib formed parallel to the width direction of the cooling water flow channel.

12. The heat exchanger of claim 10, wherein the flow guide has the first rib bent in the direction between the cooling water inlet hole and the cooling water outlet hole based on the width direction of the cooling water flow channel.

13. The heat exchanger of claim 10, wherein as the distance between the cooling water inlet hole and the cooling water discharge hole decreases, the inclination angle of the second rib gradually increases with respect to the width direction of the cooling water flow path.

* * * * *